US010912380B1

(12) United States Patent
Lu

(10) Patent No.: US 10,912,380 B1
(45) Date of Patent: Feb. 9, 2021

(54) HEIGHT-ADJUSTABLE TABLE WITH STOP CONTROL SYSTEM

(71) Applicant: Dong Guan Song Wei Electric Technology Co., Ltd., Dongguan (CN)

(72) Inventor: Weilin Lu, Dongguan (CN)

(73) Assignee: DONG GUAN SONG WEI ELECTRIC TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 16/576,777

(22) Filed: Sep. 20, 2019

(51) Int. Cl.
*A47B 9/20* (2006.01)
*G01P 13/00* (2006.01)

(52) U.S. Cl.
CPC ............... *A47B 9/20* (2013.01); *G01P 13/00* (2013.01); *A47B 2200/0057* (2013.01)

(58) Field of Classification Search
CPC ..... A47B 9/00; A47B 9/20; A47B 2200/0057; A47B 2200/0055; A47B 2200/0056; G01P 13/00
USPC ................................ 108/144.11, 147, 147.19
See application file for complete search history.

(56) References Cited

U.S. PATENT DOCUMENTS

| 6,352,037 B1* | 3/2002 | Doyle | A47B 9/00 108/147 |
|---|---|---|---|
| 2005/0012430 A1* | 1/2005 | Bastholm | A47B 9/20 310/311 |
| 2005/0187712 A1* | 8/2005 | Callaghan | B66B 5/0031 701/301 |
| 2014/0096706 A1* | 4/2014 | Labrosse | A47B 97/00 108/21 |
| 2014/0137773 A1* | 5/2014 | Mandel | G06Q 10/109 108/50.11 |
| 2015/0007756 A1* | 1/2015 | Kollreider | A47B 9/20 108/21 |
| 2015/0368082 A1* | 12/2015 | Davis | B66F 11/042 701/50 |
| 2016/0051042 A1* | 2/2016 | Koch | H02K 11/40 248/550 |
| 2016/0106205 A1* | 4/2016 | Hall | A47B 21/02 700/275 |
| 2016/0260019 A1* | 9/2016 | Riquelme Ruiz | A47B 9/00 |
| 2016/0309889 A1* | 10/2016 | Lin | A47B 9/00 |
| 2016/0353880 A1* | 12/2016 | Sigal | A47B 21/02 |
| 2017/0135587 A1* | 5/2017 | Desroches | A61B 5/14551 |
| 2018/0279770 A1* | 10/2018 | Crowe | A47B 9/10 |
| 2019/0082823 A1* | 3/2019 | Applegate | A47B 9/00 |
| 2019/0223586 A1* | 7/2019 | Hansen | A47B 9/00 |
| 2019/0261778 A1* | 8/2019 | Lukas | A47C 20/12 |
| 2020/0104762 A1* | 4/2020 | Gibson | A47C 7/72 |
| 2020/0146440 A1* | 5/2020 | Fogarty | A47B 13/06 |

* cited by examiner

*Primary Examiner* — Jose V Chen
(74) *Attorney, Agent, or Firm* — Leong C. Lei

(57) ABSTRACT

A height-adjustable table with a stop control system includes a tabletop, a table leg, a power supply, a lifting module, a sensing module, a sound module, a main control unit, and a manual controller. Through the design of the sensing module and the main control unit, when a person or an object is approaching during the descent of the tabletop, the sensing module feeds back the received signal to the main control unit and controls the lifting module to stop running. The structural design is clever and reasonable, easy to use, practical, and can be widely used.

8 Claims, 8 Drawing Sheets

US 10,912,380 B1

HEIGHT-ADJUSTABLE TABLE WITH STOP CONTROL SYSTEM

BACKGROUND OF THE INVENTION

1. Field of the Invention

The present invention relates to a table, and more particularly to a height-adjustable table with a stop control system.

2. Description of the Prior Art

Tables are widely used in our daily life for eating, working, etc. In general, a table structure mainly includes table legs and a tabletop disposed on the table legs. Most of the tables are directly placed on the ground. The height of the table cannot be adjusted according to the needs of the user. Although there are some tables that can be adjusted in height on the market. Most of tables are adjusted manually. The height adjustment is inconvenient, time-consuming and laborious.

An automatic height-adjustable table is developed accordingly. The tabletop is driven by a driving device to move up and down. The tabletop is provided with a stop device for stopping the ascent or descent of the tabletop when a person or object is approaching the table. However, its structural design is poor, inconvenient to use, and poor in practicality.

Accordingly, the inventor of the present invention has devoted himself based on his many years of practical experiences to solve these problems.

SUMMARY OF THE INVENTION

In view of the drawbacks of the prior art, the primary object of the present invention is to provide a height-adjustable table with a stop control system. Through a sensing module and a main control unit, when a person or an object is approaching during the descent of the tabletop, the sensing module feeds back a signal to the main control unit and controls a lifting module to stop running. The structural design is clever and reasonable, easy to use, practical, and can be widely used.

In order to achieve the above object, the present invention adopts the following technical solutions:

A height-adjustable table with a stop control system comprises a tabletop, a table leg, a power supply, a lifting module, a sensing module, a sound module, a main control unit, and a manual controller.

The lifting module is disposed on the table leg. The lifting module includes a lifting portion and a driving device. One end of the lifting portion is connected to the driving device, and another other end of the lifting portion is connected to the tabletop. The lifting portion is driven by the driving device to move the tabletop up or down.

The sensing module and the manual controller are disposed on the tabletop. The sensing module is disposed at an edge of a lower end of the tabletop. The manual controller is disposed at one side of the tabletop.

The main control unit is connected to the sensing module, the driving device, the sound module and the manual controller. The manual controller is connected to the driving device. The power source is connected to the sensing module, the driving device, the sound module, the main control unit and the manual controller.

When the tabletop is moved down by operating the manual controller and the sensing module senses that a person or an object is approaching, the sensing module feeds back information to the main control unit and controls the driving device to stop running, the tabletop stops moving down, the sound module sounds a warning, and an error code is displayed on the manual controller.

Compared with the prior art, the present invention has obvious advantages and beneficial effects. Specifically, it can be known from the above technical solutions. Through the design of the sensing module and the main control unit, when a person or an object is approaching during the descent of the tabletop, the sensing module feeds back the received signal to the main control unit and controls the lifting module to stop running. The structural design is clever and reasonable, easy to use, practical, and can be widely used. Besides, the sensing modules are arranged around the edge of the lower end of the tabletop, which expands the sensing range of the sensing modules, so that the sensing modules can accurately react to the approaching person or object and stop the operation of the lifting module. The operation is reliable and the usability is good.

DETAILED DESCRIPTION OF THE PREFERRED EMBODIMENTS

Figure 1:
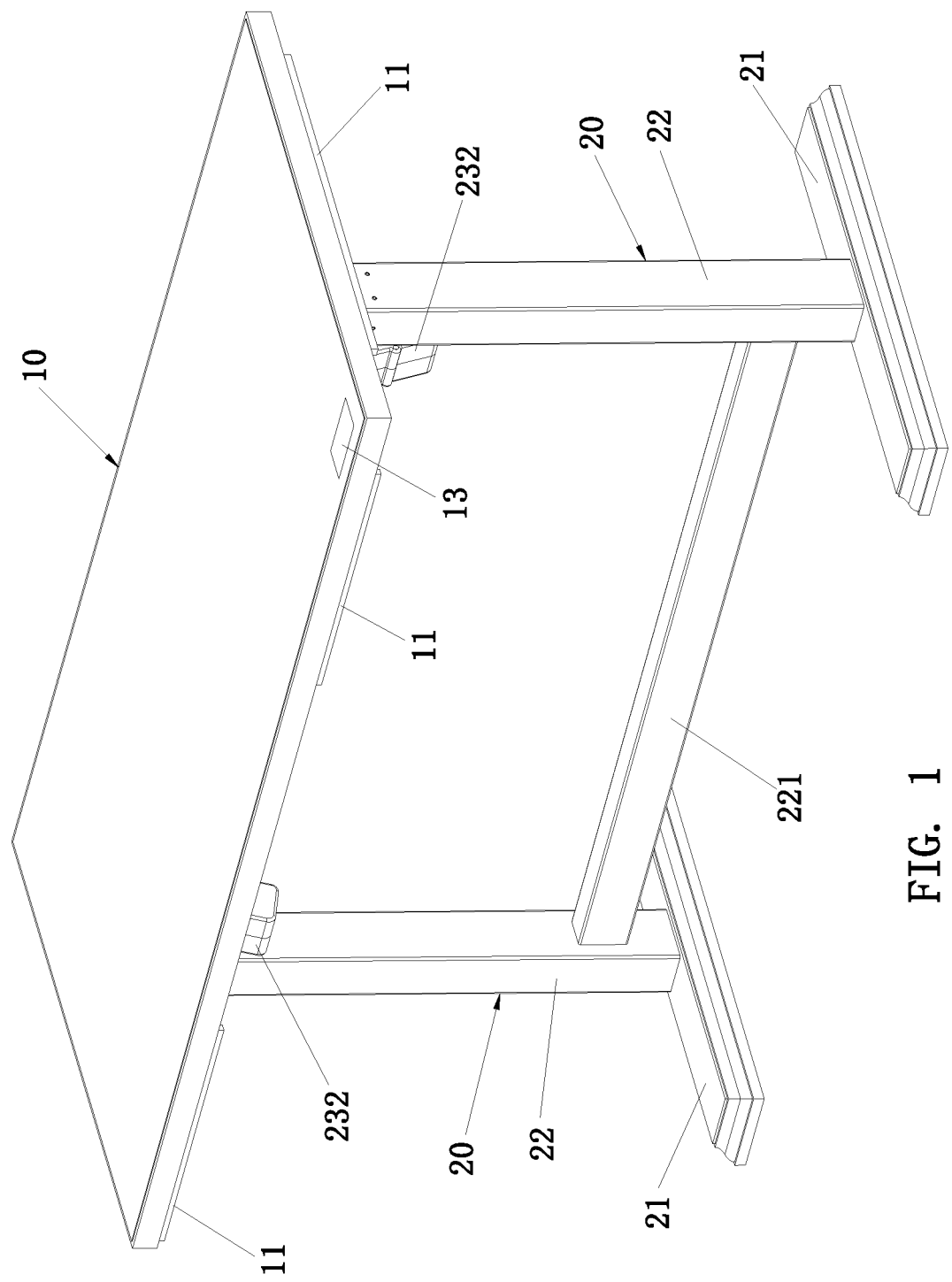
FIG. 1 is a perspective view according to a preferred embodiment of the present invention.

Embodiments of the present invention will now be described, by way of example only, with reference to the accompanying drawings.

Referring to FIG. 1 to FIG. 8, a height-adjustable table with a stop control system in accordance with a preferred embodiment of the present invention comprises a tabletop 10, a table leg 20, a power supply, a lifting module, a sensing module 11, a sound module, a main control unit 12, and a manual controller 13.

The lifting module is disposed on the table leg 20. The lifting module includes a lifting portion 231 and a driving device 232. One end of the lifting portion 231 is connected to the driving device 232, and another other end of the lifting portion 231 is connected to the tabletop 10. The lifting portion 231 is driven by the driving device 232 to move the tabletop 10 up or down.

The sensing module 11 and the manual controller 13 are disposed on the tabletop 10. The sensing module 11 is disposed at the edge of the lower end of the tabletop 10. The manual controller 13 is disposed at one side of the tabletop 10.

The main control unit 12 is connected to the sensing module 11, the driving device 232, the sound module, and the manual controller 13. The manual controller 13 is connected to the driving device 232. The power source is connected to the sensing module 11, the driving device 232, the sound module, the main control unit 12, and the manual controller 13.

When the tabletop 10 is moved down by operating the manual controller 13 and the sensing module 11 senses that a person or an object is approaching, the sensing module 11 feeds back information to the main control unit 12 and controls the driving device 232 to stop running. Then, the tabletop 10 stops moving down, the sound module sounds a warning, and an error code is displayed on the manual controller 13. Preferably, the sound module is a buzzer, and the driving device 232 is a motor. The driving device 232 has a driving circuit, a relay, and a triode. The driving circuit is connected to the main control unit and the triode. The triode is connected to the relay. The driving circuit controls the triode to selectively connect or disconnect the relay through the control signal of the main control unit, thereby controlling forward or reverse rotation of the motor to drive the tabletop 10 to move up or down. Through the design of the sensing module and the main control unit, when a person or an object is approaching during the descent of the tabletop 10, the sensing module 11 feeds back the received signal to the main control unit and controls the lifting module to stop running. The structural design is clever and reasonable, easy to use, practical, and can be widely used.

Figure 3:
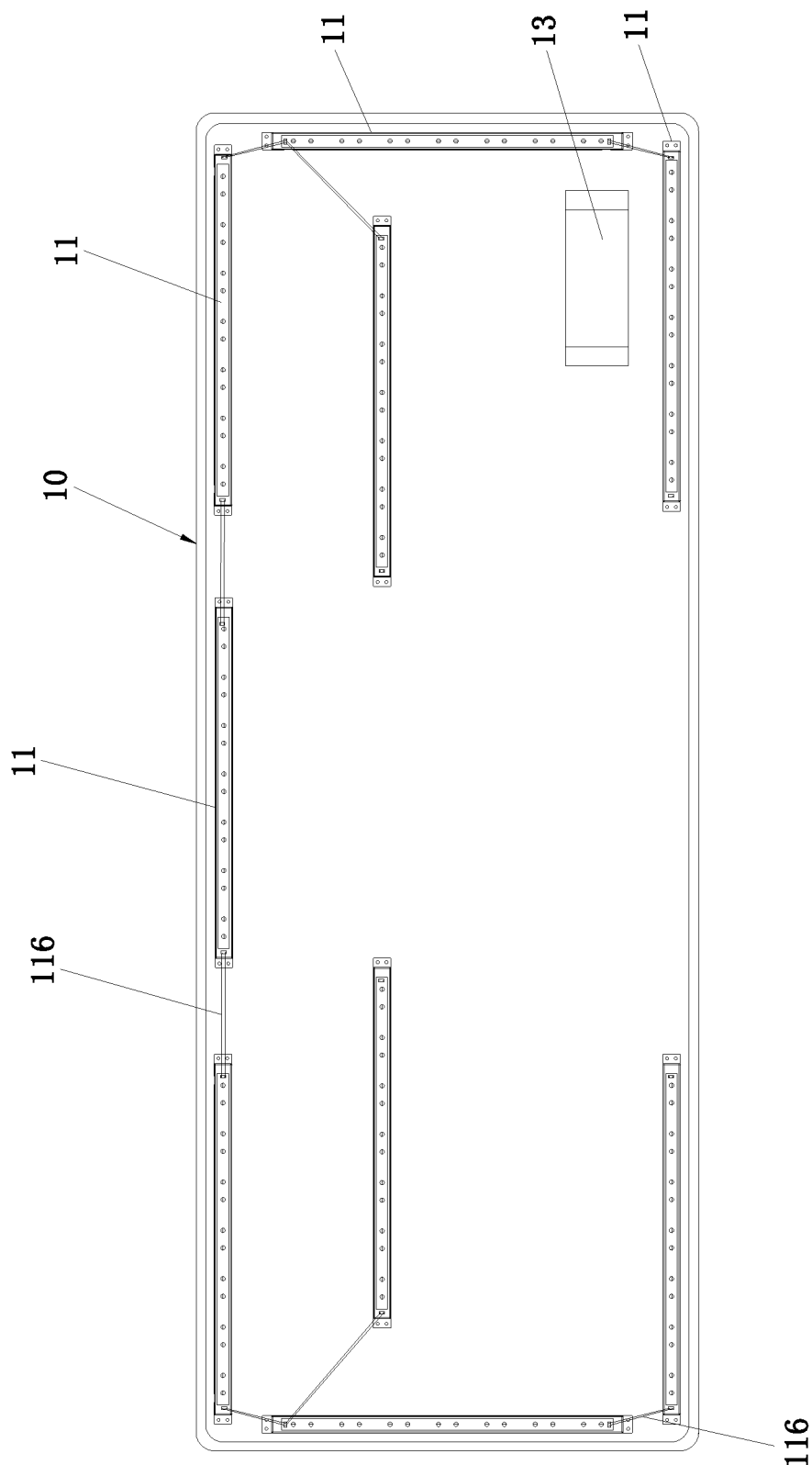
FIG. 3 is a partial bottom view according to the preferred embodiment of the present invention, showing the tabletop and the sensing module.

As shown in FIG. 3, the sensing module 11 is arranged along the periphery of the lower end of the tabletop 10. The sensing module 11 is plural and arranged at intervals around the edge of the lower end of the tabletop 10. The sensing module 11 includes a box 111 and sensing portions disposed in the box 111. The box 111 is formed with a groove 117 having a lower end opening 112. The sensing portions are arranged at intervals in the groove 117. Preferably, the tabletop 10 has a rectangular shape. The box 111 has an elongated shape. This embodiment has nine sensing modules. The nine sensing modules are arranged at intervals around the edge of the lower end of the tabletop. Three sensing modules are located at the rear of the lower end of the tabletop 10, one sensing module is located at the left of the lower end of the tabletop 10, one sensing module is located at the right of the lower end of the tabletop 10, two sensing modules are located at the middle of the lower end of the tabletop 10, and the other two sensing modules are located at the front of the lower end of the tabletop 10. A space is defined between the two sensing modules so that the user's leg may be under the space when the user sits at the table. The height of the table can be adjusted according to the needs of the user.

The box 111 is fixed to the tabletop 10 by a screw. The box 111 is formed with a positioning hole 118. The lower end of the tabletop 10 is formed with a threaded hole. The upper end of the threaded hole is a closed end. The screw is connected to the positioning hole 118 and the threaded hole in sequence from bottom to top to form an assembly connection. The two adjacent sensing modules 11 are electrically connected by a cable 116.

Figure 4:
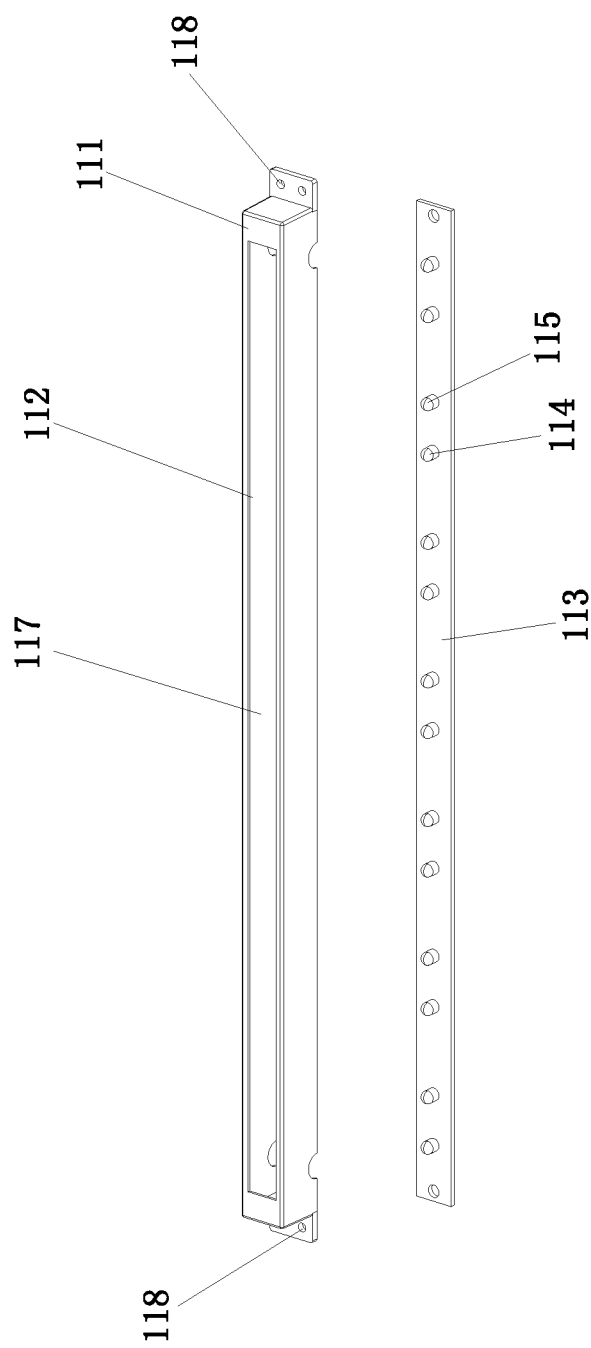
FIG. 4 is an exploded view of the sensing module according to the preferred embodiment of the present invention.

As shown in FIG. 4, the sensing portions are connected to a mounting plate portion 113. The mounting plate portion 113 extends in a direction same as the box 111. The sensing portions are arranged at intervals on the mounting plate portion 113. The sensing module 11 is an infrared sensor. Each sensing portion includes an infrared receiving diode 114 and an infrared transmitting diode 115. The infrared receiving diode 114 and the infrared transmitting diode 115 are insertedly connected to the mounting plate portion 113, or the infrared receiving diode 114 and the infrared transmitting diode 115 are connected to the mounting plate portion 113 with surface mount technology. Preferably, the box is a plastic box.

Figure 2:
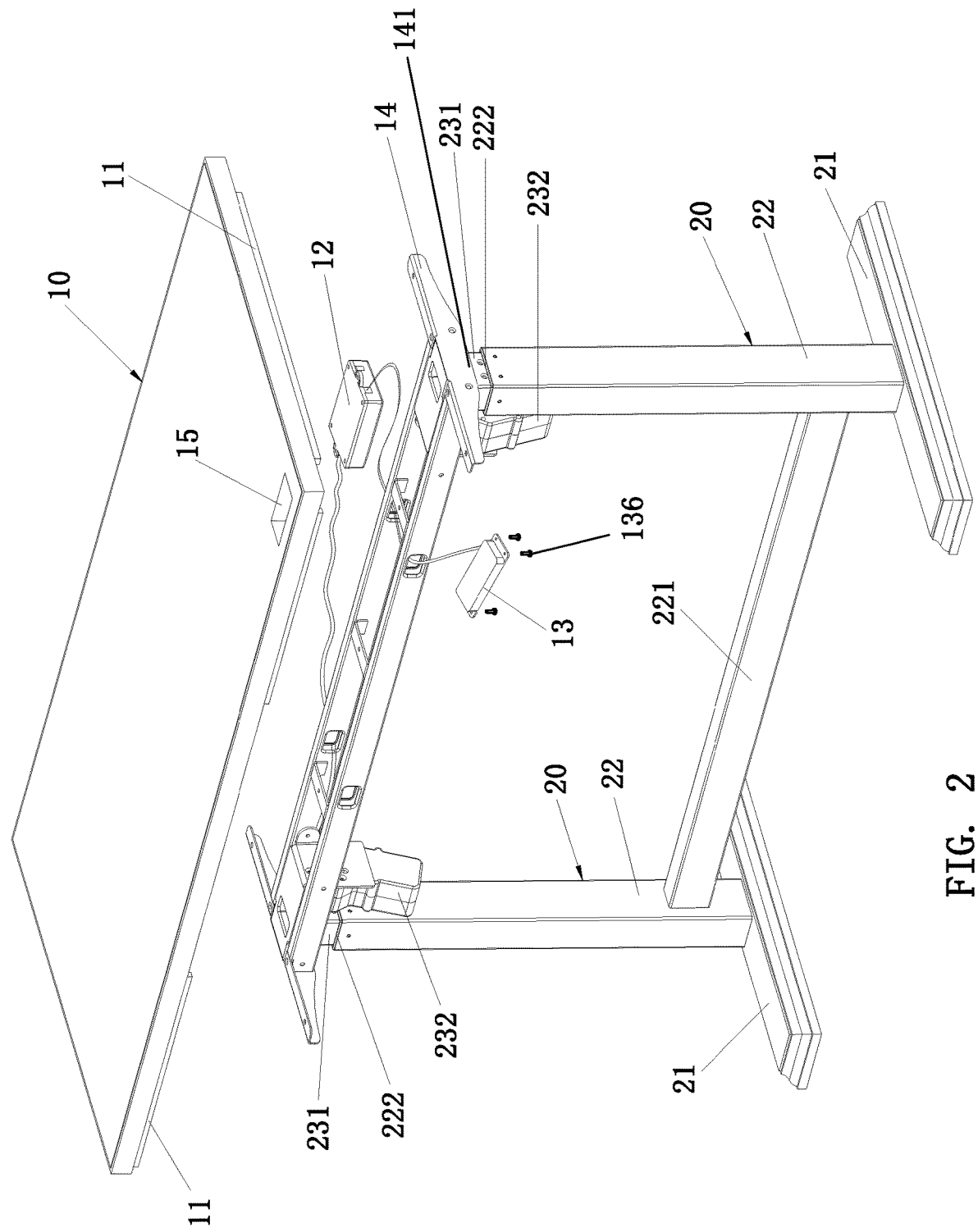
FIG. 2 is an exploded view according to the preferred embodiment of the present invention.

As shown in FIG. 1 and FIG. 2, the table leg 20 includes a base 21 and a fixed outer tube 22 disposed on the base 21. The fixed outer tube 22 is vertically arranged. The lower end of the fixed outer tube 22 is connected to the upper end of the base 21. The fixed outer tube 22 is a hollow structure. The upper end of the fixed outer tube 22 has an opening 222. The lifting portion 231 is disposed in the fixed outer tube 22. The upper end of the lifting portion 231 extends out of the fixed outer tube 22.

The lower end of the tabletop 10 is connected to a fixing frame 14. The lower end of the fixing frame 14 is provided with a positioning portion 141. The upper end of the lifting portion 231 is fixedly connected to the positioning portion 141 of the fixing frame 14.

In this embodiment, the height-adjustable table includes two table legs 20, two lifting modules, and two positioning portions. The two positioning portions are transversely spaced apart from each other and disposed on the lower end of the fixing frame 14. The two table legs 20 and the two lifting modules are respectively spaced apart from each and correspond to the two positioning portions of the fixing frame 14. The lifting portions 231 of the lifting modules are connected to the corresponding positioning portions. A connecting rod 221 is connected between the fixed outer tubes 22 of the two table legs 20.

The manual controller 13 is disposed on the front right side of the upper end of the tabletop 10. The upper end of the tabletop 10 is formed with a receiving opening 15 corresponding in position to the manual controller 13. The upper and lower ends of the receiving opening 15 penetrate through the tabletop 10. The lower end of the manual controller 13 extends outwardly to form a limiting plate portion 134. The manual controller 13 is inserted into the receiving opening 15 from bottom to top. The upper end surface of the limiting plate portion 134 is limited to the lower end surface of the tabletop 10.

The limiting plate portion 134 of the manual controller 13 and the lower end surface of the tabletop 10 are provided with connecting holes 135. The connecting hole 135 of the limiting plate portion 134 of the manual controller 13 is aligned with the connecting hole 135 of the tabletop 10. A connecting member 136 is provided and inserted into the connecting holes 135 of the limiting plate portion 134 and the tabletop 10 from bottom to top to fix the manual controller 13 to the tabletop 10. The upper end surface of the manual controller 13 is flush with the upper end surface of the tabletop 10.

Figure 5:
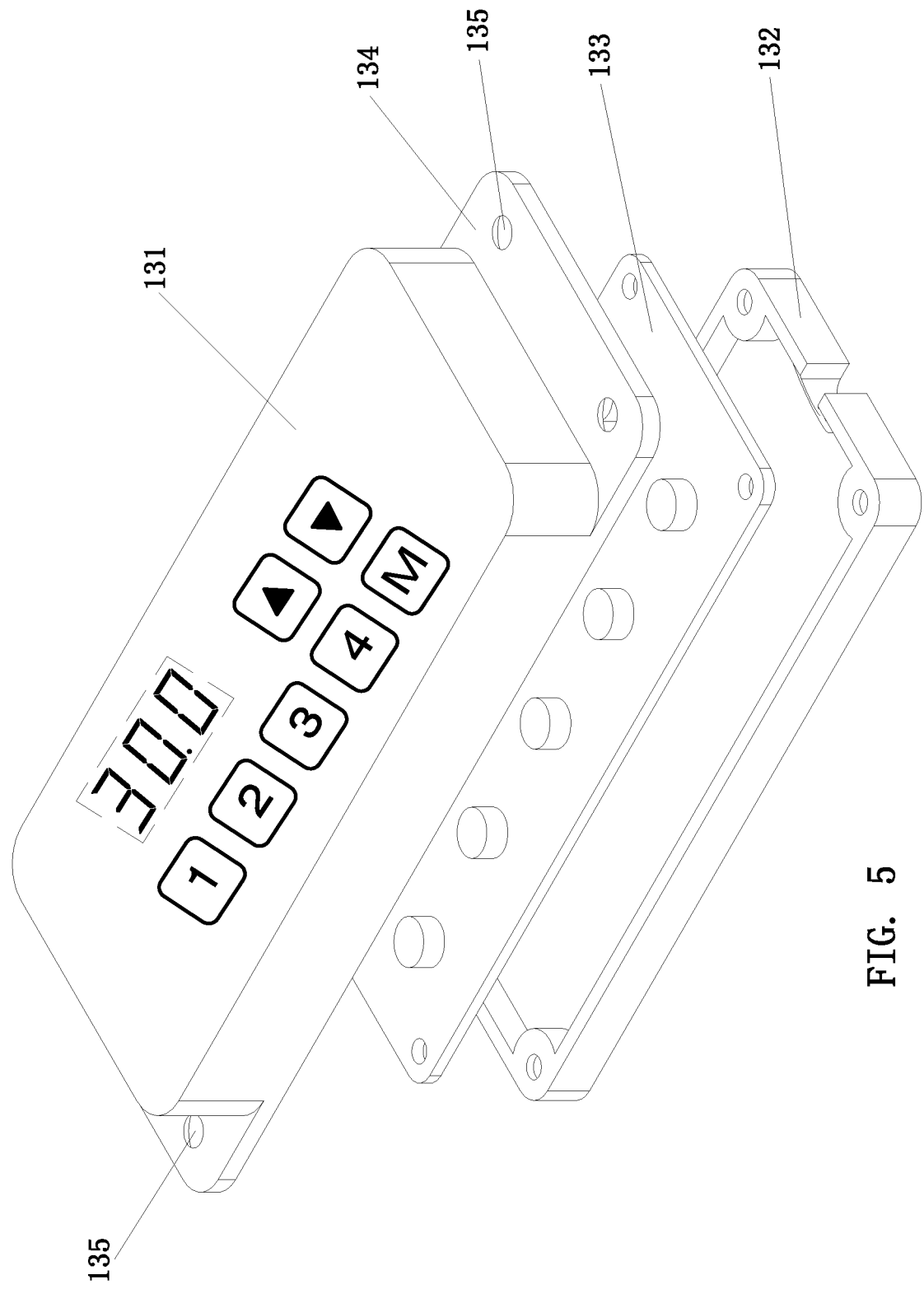
FIG. 5 is an exploded view of the manual controller according to the preferred embodiment of the present invention.
Figure 6:
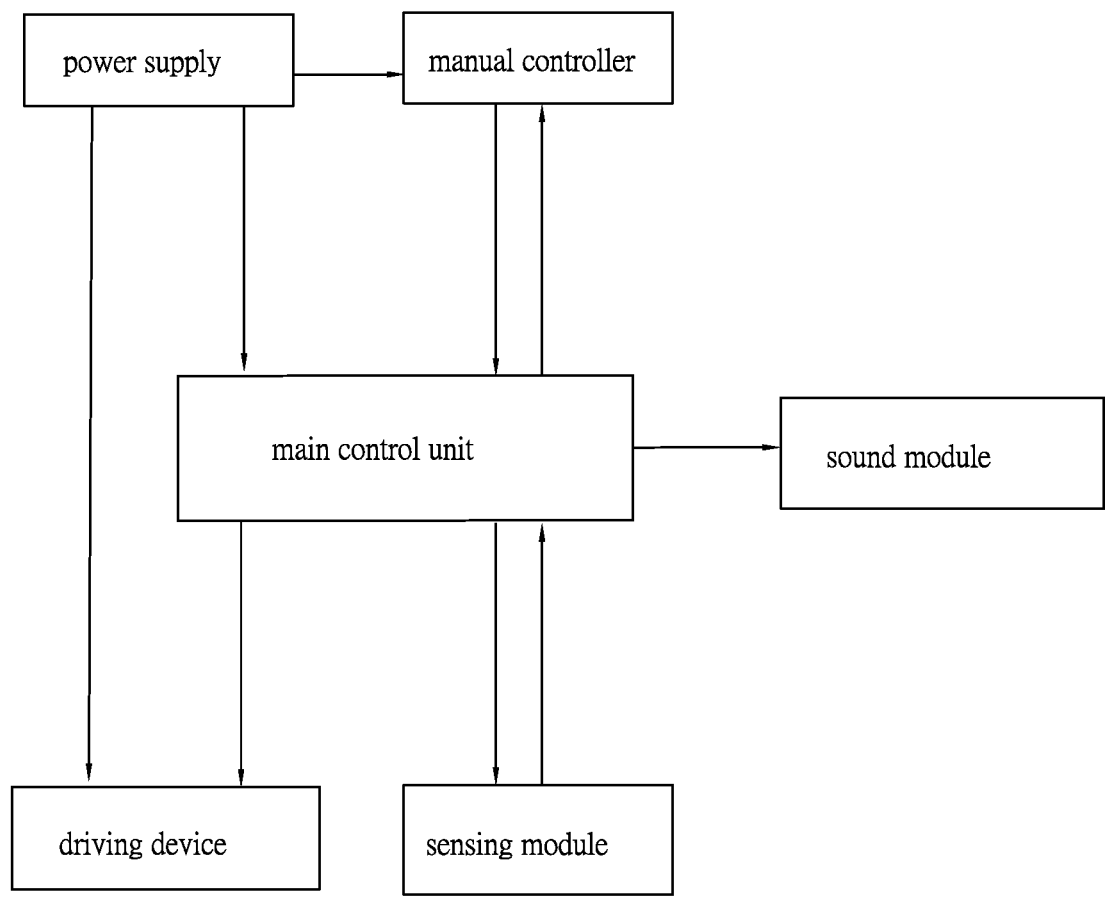
FIG. 6 is a schematic view showing the connection of the modules according to the preferred embodiment of the present invention.

As shown in FIG. 5, the manual controller 13 includes an upper casing 131, a lower casing 132, and an operation panel 133. The upper end of the upper casing 131 is provided with a window. The operation panel 133 has a display panel and an operation button. Both the display panel and the operation button are exposed through the window of the upper casing 131. The limiting plate portion 134 is disposed at the lower end of the upper casing 131. The upper casing 131 and the lower casing 132 are assembled and fixed together. The operation panel 133 is sandwiched between the upper casing 131 and the lower casing 132.

Figure 7:
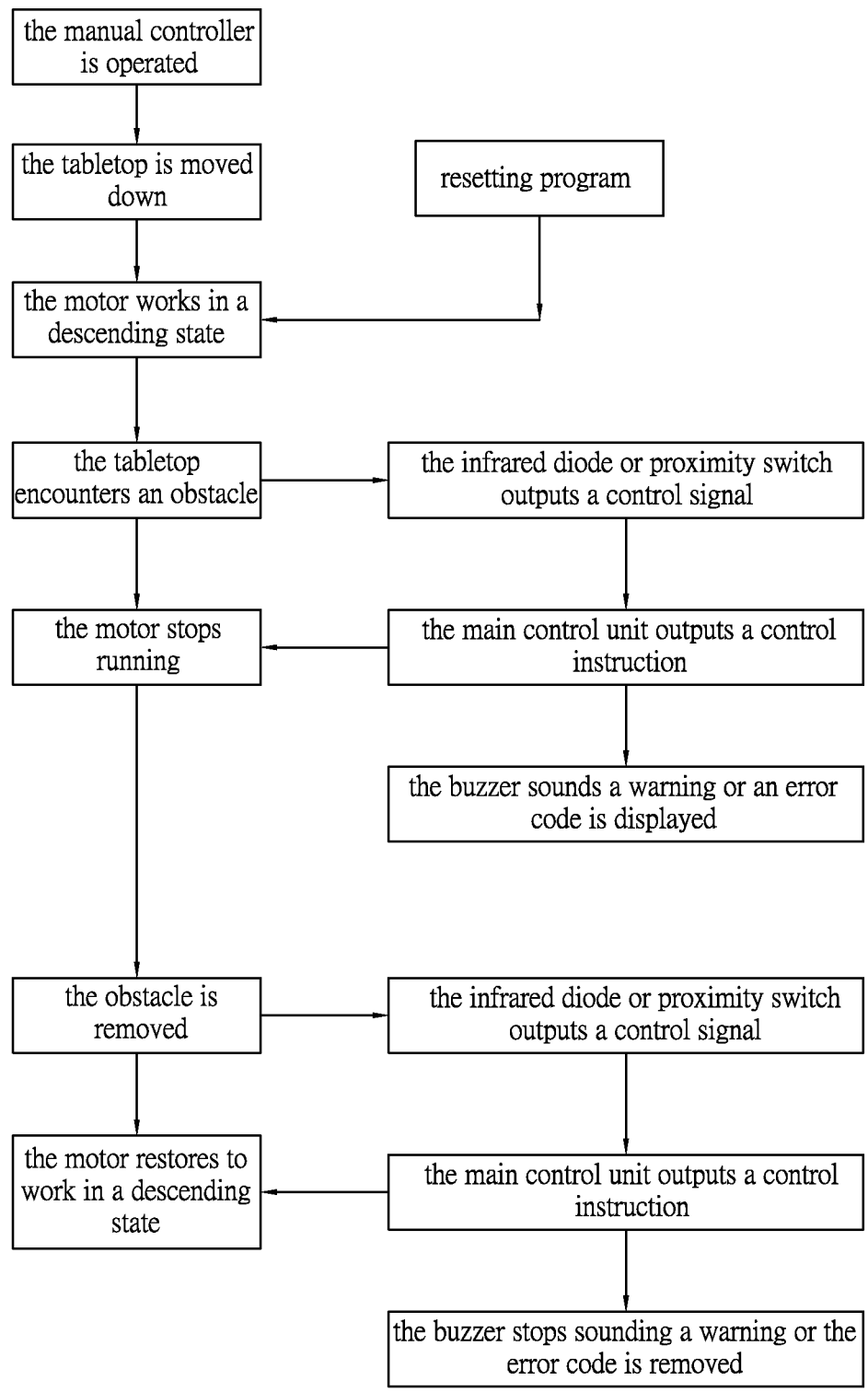
FIG. 7 is a first control flowchart according to the preferred embodiment of the present invention (in a descending state)

Next, the start-stop process is described below when the tabletop is blocked during the lifting process:

As shown in FIG. 7, the tabletop 10 is moved down by operating the manual controller 13. The driving device drives the lifting portion to be in a descending state. When the sensing module 11 senses that a person or an object is approaching, the sensing module 11 will feed back information to the main control unit 12 and control the driving device 232 to stop running. Then, the tabletop 10 stops moving down, the sound module sounds a warning, and an error code is displayed on the manual controller 13. When the person or object is away from the sensing module 11, the sensing module 11 will feed back information to the main control unit 12 and control the driving device 232 to run again. Then, the tabletop 10 is moved downward, the sound module stops sounding, and the error code is removed from the manual controller 13.

Figure 8:
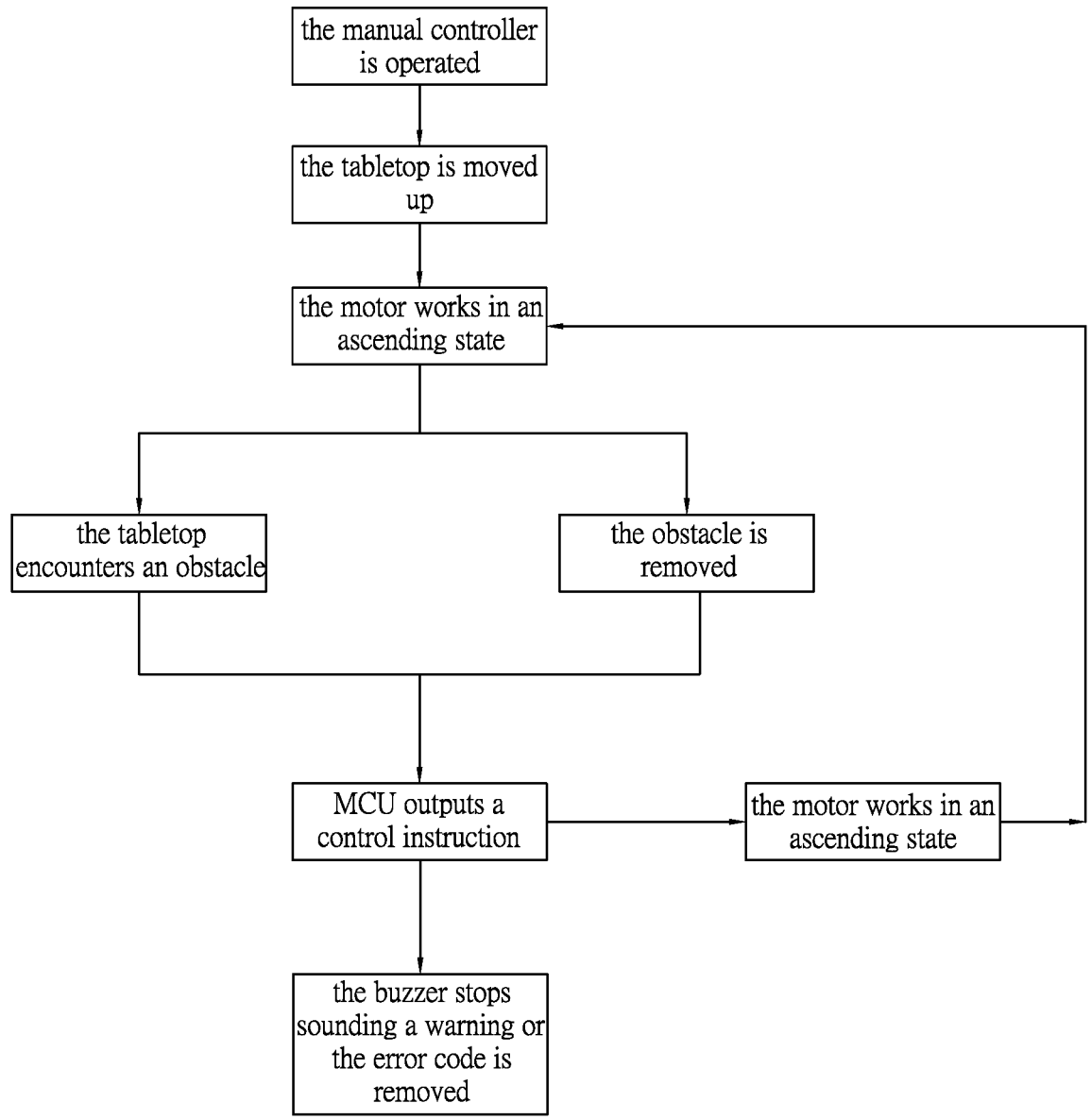
FIG. 8 is a second control flowchart according to the preferred embodiment of the present invention (in an ascending state).

As shown in FIG. 8, the tabletop 10 is moved up by operating the manual controller 13. The driving device drives the lifting portion to be in an ascending state. When the sensing module 11 senses that a person or an object is approaching, the sensing module 11 feeds back information to the main control unit 12 and controls the driving device 232 to continue running, the sound module sounds a warning, and an error code is displayed on the manual controller 13. When the person or object is away from the sensing module 11, the sound module stops sounding, and the error code is removed from the manual controller 13.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A height-adjustable table with a stop control system, comprising a tabletop, a table leg, a power supply, a lifting module, a sensing module, a sound module, a main control unit, and a manual controller;

the lifting module being disposed on the table leg, the lifting module including a lifting portion and a driving device, one end of the lifting portion being connected to the driving device, another other end of the lifting portion being connected to the tabletop, the lifting portion being driven by the driving device to move the tabletop up or down;

the sensing module and the manual controller being disposed on the tabletop, the sensing module being disposed at an edge of a lower end of the tabletop, the manual controller being disposed at one side of the tabletop;

the main control unit being connected to the sensing module, the driving device, the sound module and the manual controller, the manual controller being connected to the driving device; a power source being connected to the sensing module, the driving device, the sound module, the main control unit and the manual controller;

wherein when the tabletop is moved down by operating the manual controller and the sensing module senses that a person or an object is approaching, the sensing module feeds back information to the main control unit and controls the driving device to stop running, the tabletop stops moving down, the sound module sounds a warning, and an error code is displayed on the manual controller;

wherein the sensing module is arranged along a periphery of the lower end of the tabletop;

wherein the sensing module is plural and arranged at intervals around the edge of the lower end of the tabletop; the sensing module includes a box and sensing portions disposed in the box, the box is formed with a groove having a lower end opening, and the sensing portions are arranged at intervals in the groove.

2. The height-adjustable table as claimed in claim 1, wherein the box is fixed to the tabletop by a screw, the box is formed with a positioning hole, the lower end of the tabletop is formed with a threaded hole, an upper end of the threaded hole is a closed end, and the screw is connected to the positioning hole and the threaded hole in sequence from bottom to top.

3. The height-adjustable table as claimed in claim 1, wherein every adjacent two of the sensing modules are electrically connected by a cable.

4. The height-adjustable table as claimed in claim 1, wherein the sensing portions are connected to a mounting plate portion, the mounting plate portion extends in a direction same as the box, the sensing portions are arranged at intervals on the mounting plate portion; the sensing module is an infrared sensor, the sensing portions each include an infrared receiving diode and an infrared transmitting diode, the infrared receiving diode and the infrared transmitting diode are insertedly connected to the mounting plate portion, or the infrared receiving diode and the infrared transmitting diode are connected to the mounting plate portion with surface mount technology.

5. The height-adjustable table as claimed in claim 1, wherein the table leg includes a base and a fixed outer tube disposed on the base, the fixed outer tube is vertically arranged, a lower end of the fixed outer tube is connected to an upper end of the base, the fixed outer tube is a hollow structure, an upper end of the fixed outer tube has an opening, the lifting portion is disposed in the fixed outer tube, and an upper end of the lifting portion extends out of the fixed outer tube;

the lower end of the tabletop is connected to a fixing frame, a lower end of the fixing frame is provided with a positioning portion, and the upper end of the lifting portion is fixedly connected to the positioning portion of the fixing frame.

6. The height-adjustable table as claimed in claim 5, wherein the height-adjustable table includes two table legs, two lifting modules and two positioning portions, the two positioning portions are transversely spaced apart from each other and disposed on the lower end of the fixing frame, the two table legs and the two lifting modules are respectively spaced apart from each and correspond to the two positioning portions of the fixing frame, the lifting portions of the lifting modules are connected to the corresponding positioning portions, and a connecting rod is connected between the fixed outer tubes of the two table legs.

7. The height-adjustable table as claimed in claim 1, wherein the manual controller is disposed on a front right side of an upper end of the tabletop, the upper end of the tabletop is formed with a receiving opening corresponding in position to the manual controller, upper and lower ends of the receiving opening penetrate through the tabletop, a lower end of the manual controller extends outwardly to form a limiting plate portion, the manual controller is inserted into the receiving opening from bottom to top, an upper end surface of the limiting plate portion is limited to a lower end surface of the tabletop;

the limiting plate portion of the manual controller and the lower end surface of the tabletop are provided with connecting holes, the connecting hole of the limiting plate portion of the manual controller is aligned with the connecting hole of the tabletop, a connecting member is provided and inserted into the connecting holes of the limiting plate portion and the tabletop from bottom to top for fixing the manual controller to the tabletop; an upper end surface of the manual controller is flush with an upper end surface of the tabletop.

8. The height-adjustable table as claimed in claim 7, wherein the driving device is a motor, the driving device has a driving circuit, a relay and a triode, the driving circuit is connected to the main control unit and the triode, the triode is connected to the relay, the driving circuit controls the triode to selectively connect or disconnect the relay through a control signal of the main control unit, thereby controlling forward or reverse rotation of the motor to drive the tabletop to move up or down.

\* \* \* \* \*